United States Patent [19]

Iida et al.

[11] 4,284,540
[45] Aug. 18, 1981

[54] POLYETHYLENE TEREPHTHALATE MOLDING COMPOSITIONS

[75] Inventors: Hiroshi Iida; Kiichi Kometani; Masana Yanagi, all of Nagoya, Japan

[73] Assignee: Toray Industries, Inc., Tokyo, Japan

[21] Appl. No.: 140,886

[22] Filed: Apr. 16, 1980

[30] Foreign Application Priority Data

Apr. 17, 1979 [JP] Japan ................ 54-46018

[51] Int. Cl.$^3$ ................ C08L 63/00; C08L 67/00
[52] U.S. Cl. ................ 260/22 R; 260/22 EP; 260/31.2 XA; 260/40 R; 525/176
[58] Field of Search ........ 260/40 R, 31.2 XA, 22 EP; 525/176

[56] References Cited

U.S. PATENT DOCUMENTS

| | | | |
|---|---|---|---|
| 3,368,995 | 2/1968 | Furukawa et al. ................ | 260/40 R |
| 3,557,042 | 1/1971 | Dalhuisen ................ | 260/31.2 XA |
| 4,073,827 | 2/1978 | Okasaka et al. ................ | 525/176 |
| 4,097,431 | 6/1978 | Asahara et al. ................ | 260/22 R |
| 4,115,333 | 9/1978 | Phipps et al. ................ | 260/22 R |
| 4,126,592 | 11/1978 | Borman et al. ................ | 260/22 R |
| 4,229,332 | 10/1980 | Kyo et al. ................ | 260/31.2 XA |

*Primary Examiner*—Ronald W. Griffin
*Attorney, Agent, or Firm*—Miller & Prestia

[57] ABSTRACT

Impact-modified and moldability-improved polyethylene terephthalate molding compositions are provided which comprise polyethylene terephthalate resins, a copolymer of α-olefins and glycidyl esters of α,β-ethylenically-unsaturated carboxylic acids and barium salt of fatty acids. Glass fiber reinforcement of the polyester compositions is preferable because of further enhancement of the moldability of the polyester composition thereof. In addition, resistance to moist heat is also increased.

13 Claims, No Drawings

POLYETHYLENE TEREPHTHALATE MOLDING COMPOSITIONS

FIELD OF THE INVENTION

This invention relates to polyethylene terephthalate molding compositions having improved properties, such as moldability, toughness and resistance to moist heat.

Compositions of the present invention comprise polyethylene terephthalate resins, α-olefins and glycidyl esters of α,β-ethylenically-unsaturated carboxylic acids and barium salts of fatty acids. Moreover, fiber reinforcements may be used as occasion demands. The remarkable effects of these improvements ae attained by the combined use of these above ingredients.

BACKGROUND OF THE INVENTION

Thermoplastic polyesters which are produced from aromatic dicarboxylic acids and aliphatic or cycloaliphatic glycols, especially polyethylene terephthalate, are widely used for fibers and films. Despite the desirable properties of polyethylene terephthalate, it has not generally been used as a molding material under the existing technological circumstances. In the past, this has been so because the rate of crystallization of polyethylene terephthalate is slow compared with other moldable crystalline polymers, and sufficiently crystallized molded articles could not be formed under normal injection molding conditions utilizing this polymer. Molding of polyethylene terephthalate under conventional molding conditions, for example, from 70° to 100° C. mold temperature, would bring about non-uniform properties, including a non-uniform appearance of the molded articles. Therefore, polyethylene terephthalate should be molded into articles using a mold temperature greater than 130° C., and a longer molding cycle. However, this would cause a great decrease in overall working efficiency.

Another reason that polyethylene terephthalate has not generally been used in the past as a molding material is that it is inferior in toughness and has poor resistance to moist heat.

In order to improve the moldability of polyethylene terephthalate, it has been proposed to add various kinds of promoters of crystallization, e.g. benzophenone, and nucleating agents, such as for example, inorganic powder, metal soaps, and a combination of them. However, even if these molding techniques are employed, polyethylene terephthalate cannot be sufficiently molded to any practical degree. Molding can be carried out at a comparatively low temperature but with the sacrifice of the molding cycle. Furthermore, even if the molding is carried out under such conditions, a damaged appearance of the molded articles would result.

In Japanese Patent Publication No. 48-4097, it is disclosed that lithium, sodium or barium salts of monocarboxylic acids are effective in shortening the cycle time in the molding of polyethylene terephthalate. This technique, however, is not effective in lowering the molding temperature.

In U.S. Pat. No. 3,368,995, it is disclosed that certain kinds of particular additives are recommended as nucleating agents of compositions comprising polyethylene terephthalate and glass fibers. The nucleating agents include carbon powders such as graphite and carbon black, oxides of the metals of Group II of the Periodic Table such as ZnO and MgO, sulfates such as $CaSO_4$ and $BaSO_4$, phosphates such as $Ca_3(PO_4)_2$, silicates such as $CaSiO_3$ and $MgSiO_3$, oxalates such as calcium oxalates, stearates such as magnesium stearate, benzoates such as calcium benzoate, salicylates such as zinc salicylate, talc and the neutral clays.

On the other hand, various methods have been proposed in order to improve the toughness of polyethylene terephthalate as a molding material. The method shown in Japanese Patent Publication Kokai No. 52-32045 indicates that a composition of α-olefins and glycidyl esters of α,β-ethylenically-unsaturated carboxylic acid copolymers blended with polyesters is sufficiently effective to impart toughness to polyesters. This composition, however, cannot be effectively employed for injection molding of materials because of its longer molding cycle as compared to the molding cycle of polyester alone. Therefore, the improvements in the moldability of compositions comprising polyethylene terephthalate and the above-mentioned olefinic copolymers are greatly needed.

Polyethylene terephthalate resins have still another weak point in that they are subject to hydrolysis reactions which result, in time, in a degradation of their properties in the presence of moisture: the long polymer chain is degraded to a progressively lower molecular weight, and its strength and flexibility are reduced. Therefore, an improvement in the resistance to hydrolysis (moist heat) of polyethylene terephthalate is strongly desired.

In order to improve the crystallization characteristics of polyethylene terephthalate, it is necessary to expand both the upper and lower temperature regions in which crystallization can be induced, and to improve the crystallization rate.

As one approach, it is desired that the Tc is raised and the Tcc is lowered (Tc and Tcc representing the crystallization peak temperatures under the lowering and raising processes, respectively, as indicated by the Differential Scanning Colorimeter). The polymer indicating a higher Tc would be molded with a shorter molding cycle. The lower Tcc would make it possible for a lower molding temperature to be employed. In the conventional methods for the molding of polyethylene terephthalate resins, neither of the above requirements have been satisfactorily attained.

As a result of a detailed investigation on the crystallization characteristics of compositions comprising polyethylene terephthalate and the copolymers of α-olefins and glycidyl esters of α,β-ethylenically-unsaturated carboxylic acids, already known as modifiers which impart toughness to polyesters, it has been discovered that the above-mentioned copolymers extended the proper crystallization temperature region of polyethylene terephthalate downward and made the compositions easy to crystallize even at lower temperatures. However, this blend of the copolymers lowers the upper limit of the crystallization temperature region at the same time. Consequently, the blended composite of these two ingredients has a characteristic property of crystallizing at lower temperatures, but of being difficult to crystallize as a composition compared with polyethylene terephthalate alone.

It has now been found that the above-stated problems can be dramatically solved by adding barium salts of fatty acids to a composition including the above-mentioned two polymers. Barium salts of fatty acids lead to a more rapid crystallization rate of the composite material, contributing to increase the crystallization rate of the lower temperature region synergistically with the olefinic copolymer and further to extend the upper region of the crystallization temperature.

In addition, barium salts of fatty acids promote the reaction between the polyethylene terephthalate and the glycidyl esters of α-olefin, and α,β-ethylenically-unsaturated carboxylic acid copolymers on the interface of both ingredients, resulting in a more effective action of the copolymer which causes as enhancement in the mechanical properties and resistance to moist heat of the molded articles.

DETAILED DESCRIPTION OF THE INVENTION

According to this invention, there are provided polyethylene terephthalate compositions with improved moldability, toughness and resistance to moist heat. These compositions are useful for molding, e.g. injection molding, compression molding, transfer molding and the like, and consist of (a) 100 parts by weight of polyethylene terephthalate, (b) 0.1 to 40 parts by weight of copolymers consisting of α-olefins and glycidyl esters of α,β-ethylenically-unsaturated carboxylic acid, (c) 0.1 to 5 parts by weight of barium salts of fatty acids having 8 to 33 carbon atoms, and optionally (d) up to 100 parts by weight of a conventional reinforcing agent.

The polyethylene terephthalate resins utilized in the compositions of the present invention are available commercially or can be prepared by known methods in which conventional polymerization catalysts are used. For example, tin compounds, titanium compounds for esterification reactions, lithium, manganese, magnesium, calcium, cobalt and titanium compounds, especially their acetates for ester interchange reactions, and antimony compounds such as antimony trioxide, tin, germanium compounds for polymerization reactions are recommended. The selection of the catalysts is important because they often effect the reaction of the olefinic copolymer with the polyethylene terephthalate. Antimony compounds as polymerization catalysts are preferable for promoting the aforesaid reaction.

The polyethylene terephthalate copolymers may contain as a third ingredient aliphatic dicarboxylic acids of 2 to 20 carbon atoms such as for example azelaic acid, sebasic acid, adipic acid or dodecane dicarboxylic acid, aromatic dicarboxylic acids such as isophthalic acid, orthophthalic acid, naphthalene dicarboxylic acid, diphenyl-4,4'-dicarboxylic acid or diphenylethane-4,4'-dicarboxylic acid, alicyclic dicarboxylic acids such as cyclohexane dicarboxylic acid; aliphatic glycols having 2 to 20 carbon atoms, such as ethylene glycol, propylene glycol, 1,4-butanediol, neopentylglycol, 1,5-pentanediol, 1,6-hexanediol, decamethyleneglycol, cyclohexane dimethanol or cyclohexanediol, and polymeric glycols having a molecular weight of from 400 to 20000 such as polyethylene glycol, poly-1,3-propylene glycol, and methylene glycol, as examples.

It is desirable for the polyethylene terephalate used herein to have an intrinsic viscosity of at least about 0.4 deciliters/gram and preferably, at least about 0.6 deciliters/gram as measured at 1.0% concentration in an o-chlorophenol solution at 25° C. When using polyethylene terephthalate having an intrinsic viscosity of less than 0.6, it is not possible to obtain articles having satisfactory mechanical properties.

In this invention, fibrous reinforcements of up to 100 parts by weight on the basis of the polyethylene terephthalate such as for example glass fibers, asbestos or other inorganic powders, may be compounded with the polyethylene terephthalate. Glass fiber is especially preferred as the reinforcement, and its use has been found to achieve mechanical properties which are more sufficient.

The α-olefins in the olefinic copolymer formed from α-olefins and glycidyl esters of α,β-ethylenically-unsaturated aliphatic carboxylic acids are selected from the group consisting of ethylene, propylene, butene, etc. Ethylene is especially preferred.

The glycidyl esters of α,β-ethylenically-unsaturated carboxylic acids utilized in the present invention are of the general formula

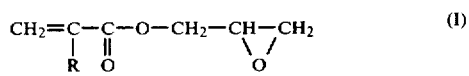

wherein R is hydrogen or a lower alkyl radical such as methyl, ethyl, etc.

Glycidyl acrylate, glycidyl methacrylate and glycidyl ethacrylate are cited as concrete examples. Glycidyl methacrylate is more preferably used. The copolymers advantageously have a glycidyl unit of α,β-ethylenically-unsaturated carboxylic acid content in the range of from 1 to 50% by weight, and may also include unsaturated monomers that are able to be copolymerized with the above-mentioned two ingredients within the range of about 40 mol %, such as for example vinyl ethers, vinyl esters such as vinyl acetate, vinyl propionate, methyl, ethyl or propyl acrylate and methacrylate, acrylonitrile, styrene, etc.

The above-mentioned olefinic copolymers are in an amount ranging between 0.1 to 40 parts by weight, preferably 0.5 to 30 parts by weight based on 100 parts by weight of polyethylene terephthalate. If less than 0.1 parts by weight of the copolymer is used, only molded articles having insufficient mechanical properties would be obtained. On the other hand, when the content of the olefinic copolymer is beyond 40 parts by weight, the moldability cannot be improved, and the modulus of the molded articles is reduced.

The third ingredient of the composition of this invention is barium salts of the aliphatic or olefinic fatty acids having 8 to 33 carbon atoms, such as for example barium salts of palmitic acid, lauric acid, stearic acid, montanic acid, oleic acid, linoleic acid, linolenic acid, sebacic acid, hydroxy stearic acids, 9,10-epoxy stearic acid, etc.

From the foregoing compounds, it is apparent that the barium salts utilized in this invention contain substituent groups on any site of the side chain of the fatty acids, and these barium salts of the fatty acids bring about the specific effects in the compositions which comprise polyethylene terephthalate and the olefinic copolymer by the addition thereof. One of these effects is the remarkable improvement in crystallization of the composition which results in an improvement in its moldability. Such an effect cannot be achieved utilizing the known nucleating agents for polyethylene terephthalate, such as for example neutral clays, the oxides, sulfates, phosphates, and silicates of the metals of Group II of the Periodic Table and zinc, magnesium, calcium or aluminium salts of fatty acids.

Another effect of adding the barium salts is the promotion of the reaction between polyethylene terephthalate and the aforementioned olefinic copolymers.

Therefore, the impact properties of the compositions are improved even more. In addition, the far-reaching influence of the barium salt extends to the enhancement of the resistance to moist heat, which might be partly due to the reduction in the concentration of the carboxylic end groups of polyethylene terephthalate.

These above effects can be realized only by using barium salts of the fatty acids. For instance, by the utilization of sodium stearate, a salt of a typical metal of Group I of the Periodic Table, an improvement in the crystallization behavior can be found, but only a little promotion of facial bonding between the polyethylene terephthalate and the copolymer containing the glycidyl functional groups can be found. Therefore, sufficient reinforcement of the compositions cannot be obtained.

On the other hand, the salts of magnesium, calcium or zinc, members of Group II of the Periodic Table with the exception of barium, are inferior to the barium salts in all the characteristics of this invention, expecially in the effect of the promotion of crystallization.

The barium salts of fatty acids which may be used singly or in combination with more than two species are contained in the range of 0.1 to 5 parts, preferably 0.3 to 3 parts by weight based on 100 parts by weight of polyethylene terephthalate. When less than 0.1 parts by weight of the additives are used, serviceable results are not obtained, and when more than 5 parts by weight are used, the mechanical properties of the molded articles, especially that of toughness, are reduced.

In the present invention, the use of various kinds of reinforcements is important to enhance the mechanical, thermal and other properties, and the moldability of the compositions as compared with unreinforced compositions. Glass fiber is most effective as a reinforcement. The reinforcing agent may also comprise, in addition to a fibrous glass reinforcement for example, a mineral reinforcing filler, such as clay, talc, quartz, mica, calcium silicate, titanium dioxide, and the like.

Besides the remarkable merit of the composition of the present invention when containing glass fibers, the compositions of the present invention comprising the components of polyethylene terephthalate, glass fiber as reinforcement, α-olefins and glycidyl esters of α,β-ethylenically-unsaturated carboxylic acid copolymers, and barium salts of fatty acids have no drop in modulus as seen generally when ordinary termoplastics are blended with elastomers.

Glass fibers which may be used in the present invention conventionally have an average standard diameter of greater than about 5μ. The length of the glass filaments and whether or not they are bundled into fibers and the fibers bundled, in turn, into yarns, ropes or rovings, and the like, are not critical to this invention. However, for the purpose of preparing the present compositions, it is convenient to use filamentous glass in the form of chopped strands of from about 1.5 mm to about 10 mm long, and preferably less than about 6 mm long. In the pellets and molded articles of the compositions on the other hand, even shorter lengths will be encountered, because during compounding, considerable fragmentation occurs. This is, however, desirable because the best properties are exhibited by injection molded articles in which the filament lengths are between 0.03 mm and 1 mm. Especially preferred are glass fibers having an average standard diameter in the range of 5 to 11μ, and the average filament length dispersed in the molded articles being between 0.15 mm and 0.4 mm.

Consequently, glass filaments are dispersed uniformly and the molded articles exhibit uniform and balanced mechanical properties, especially surface smoothness.

The amount of the glass fibers can vary broadly up to about 100 parts by weight based on 100 parts by weight of the polyethylene terephthalate resin.

Other ingredients can be added for their conventionally-employed purposes within specified limits. Among these, the use of plasticizers represented by the following general formulas II and III are recommended.

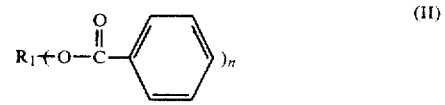

wherein $R_1$ is an alcoholic residue having 1 to 20 carbon atoms and n is from 1 to 4,

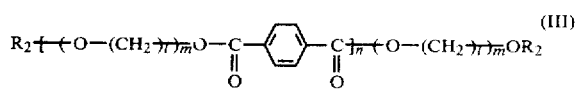

wherein $R_2$ is hydrogen or carboxylic residue, and l, m, and n are 2 to 10, 1 to 10 and 1 to 30, respectively.

As examples of compounds represented by the general formula II above, triethylene glycol dibenzoate, neopentyl glycol dibenzoate and polyethylene glycol dibenzoate, etc., are cited.

As examples of compounds represented by the general formula III are oligomers of ethylene terephthalate and butylene terephthalate where n is from 1 to 30 are cited. These additives are effective in enhancing the moldability of the compositions, namely, addition of these compounds promotes the crystallinity of the compositions, facilitates mold release, and imparts a smooth surface to the molded articles. The ester linkages represented by the above formulas II and III should be used in an amount of from 0 to about 10 parts by weight.

These other conventionally-used additives are in an amount of about 100 parts by weight of the polyethylene terephthalate resin.

Ingredients such as for example antioxidants and stabilizers, e.g. hindered phenols, typical examples of which are "Irganox" 1010, 1076, and 1098 which are produced by Ciba-Geigy Corp., hydroquinones, phosphites and their derivatives, ultraviolet absorbents, e.g. resorcinols, salicylates, benzotriazoles and benzophenones, lubricants, mold releasing agents, e.g. montanic acid, its ester or half-ester, stearyl alcohol, stearylamide and so on, dyes, pigments such as carbon black, titanium dioxide and the like; flame retardants, e.g. halogenated compounds such as decabromodiphenylether and brominated polycarbonate, melamine, cyanuric acid and their salts, antimony dioxide and the like; antistatic agents and nucleating agents except barium salts of the fatty acids, etc., may also be added.

It has been found that even relatively minor amounts of various kinds of other polymers, except those included in the present invention, can be added. Such polymers are thermoplastics, e.g. polyethylene, polypropylene, acrylic resins, fluoroethylene resin, polyamide, polyacetate, polycarbonate, polysulfone and polyphenylene oxide, thermosetting resins, e.g. phenolic resin, melamine resin, unsaturated polyester resin, silicone resin and epoxy resin, and soft thermoplastic resins such as ethylenevinylacetate copolymers, polyester elastomers and ethylenepropylene terpolymers, etc.

There is no limitation in the preparative method of the compositions of the present invention. The mixing of the polyethylene terephthalate with the aforesaid olefinic copolymer, the barium salts and the other additives such as glass fibers, if necessary, can be carried out using the conventional extruder, followed by cutting the extruded product into chips or pellets.

The compositions of the present invention can be molded by the conventional methods such as injection molding and extrusion molding, and the obtained molded articles exhibit excellent properties.

the Table, were compounded and extruded at 285° C., and the extrudate was pelletized. Thermal analysis was carried out on the pellets using the Differential Scanning Colorimeter (DSC-1 manufactured by Perkin Elmer Co.). In addition, the extrudate was molded into test pieces and evaluated as to physical properties. The test results are as summarized in Table 1, wherein it can be seen that the compositions which contain the olefinic copolymer and barium salts of the fatty acids possess good moldability and mechanical properties, as indicated by the improved tensile strength and impact strength as measured by Izod impacts, in comparison with the Control compositions.

TABLE 1

|  | Control | | Example | | | Comparative | |
| --- | --- | --- | --- | --- | --- | --- | --- |
|  | 1 | 2 | 1 | 2 | 3 | 1 | 2 |
| Composition | | | | | | | |
| PET (parts by weight) | 100 | 100 | 100 | 100 | 100 | 100 | 100 |
| E-GMA copolymer (parts by weight) | — | 10 | 10 | 10 | 10 | 10 | 10 |
| Barium Salts (parts by weight) | — | — | Barium Stearate | Barium 9,10-Epoxy Stearate | Barium Palmitate | Talc | Zinc Stearate |
|  |  |  | 1.0 | 1.0 | 1.0 | 1.0 | 1.0 |
| Thermal Properties | | | | | | | |
| Tcc (°C.) | 153 | 120 | 108 | 115 | 109 | 119 | 120 |
| Tc (°C.) | 180 | 178 | 208 | 205 | 207 | 190 | 188 |
| Moldability | | | | | | | |
| Mold Temperature/Molding cycles | | | | | | | |
| 110° C./25 sec. | x | x | o | o | o | Δ | x |
| 110° C./40 sec. | x | x | o | o | o | o | Δ |
| 140° C./40 sec. | o | o | o | o | o | o | o |
| Mechanical Properties | | | | | | | |
| Tensile Strength (kg/cm$^2$) | 560 | 540 | 720 | 705 | 710 | 660 | 630 |
| Flexural Modulus (kg/cm$^2$) | 21,000 | 20,500 | 29,000 | 28,500 | 29,000 | 25,000 | 23,000 |
| Notched Izod Impact Strength (kg cm/cm) | 1.8 | 2.9 | 4.2 | 4.0 | 4.2 | 3.3 | 3.0 |
| Hot Water Resistivity | | | | | | | |
| (80° C., 30 days) Preservation of Tensile Strength (%) | 51 | 57 | 67 | 66 | 65 | 57 | 63 | x is poor;
o is good;
Δ is fair;
Moldability was evaluated from the view point of Sink Mark and Mold Release.

The following examples are presented for a better understanding of the present invention, but should be considered as illustrative only and are not to be construed as limiting the scope of the invention as defined in the appended claims.

EXAMPLES 1-3

Dry blends of 100 parts by weight of polyethylene terephthalate (PET) having an intrinsic viscosity of 0.62 dl/g as measured in an o-chlorophenol solution at 25° C., ethylene-glycidyl methacrylae (E-GMA) (about 90 to 10 weight % mixture) copolymer and the additives indicated in Table 1 below, in the amounts as shown in

EXAMPLES 4-6

Compositions of polyethylene terephthalate (PET) having an intrinsic viscosity of 0.62 dl/g, glass fibers having a diameter of 10μ and a length of 3 mm, ethylene glycidyl methacrylate (E-GMA) (10 to 90 weight % composition) copolymer and barium salts were compounded, extruded, pelletized and evaluated as in Examples 1-3. The formulations and physical properties are summarized in Table 2, and show that the compositions of the present invention, including the addition thereto of glass fibers, are useful in light of the above teaching.

TABLE 2

|  | Control | | Example | | | | Comparative | |
| --- | --- | --- | --- | --- | --- | --- | --- | --- |
|  | 3 | 4 | 4 | 5 | 6 | 7 | 3 | 4 |
| Composition | | | | | | | | |
| PET (parts by weight) | 100 | 100 | 100 | 100 | 100 | 100 | 100 | 100 |
| Glass Fibers (parts by weight) | 43 | 45 | 45 | 45 | 80 | 45 | 45 | 45 |
| E-GMA Copolymer (parts by weight) | — | 4.5 | 4.5 | 5 | 4 | 4.5 | 4.5 | 4.5 |
| Barium Salts (parts by |

TABLE 2-continued

|  | Control | | Example | | | | Comparative | |
|---|---|---|---|---|---|---|---|---|
|  | 3 | 4 | 4 | 5 | 6 | 7 | 3 | 4 |
| weight) | — | — | Barium Stearate 1.5 | Barium Oleate 1.5 | Barium Stearate 2 | Barium Stearate 1.5 | Talc 1.5 | Calcium Stearate 1.5 |
| Triethylene Glycol Dibenzoate (parts by weight) | — | — | — | — | — | 2 | — | 1.5 |
| Thermal Properties | | | | | | | | |
| Tc (°C.) | 185 | 179 | 212 | 210 | 216 | 218 | 195 | 186 |
| Tcc (°C.) | 133 | 115 | 102 | 101 | 105 | not detectable | 110 | 114 |
| Moldability | | | | | | | | |
| Mold Temperature/molding cycles | | | | | | | | |
| 105° C./20 sec. | x | x | o | o | o | o | Δ | x |
| 105° C./40 sec. | x | x | o | o | o | o | o | Δ |
| 130° C./40 sec. | o | o | o | o | o | o | o | o |
| Appearance | x | x | o | o | o | o | x | o |
| Mechanical Properties | | | | | | | | |
| Tensile Strength (kg/cm²) | 1540 | 1500 | 1710 | 1690 | 2050 | 1680 | 1530 | 1600 |
| Flexural Modulus (kg/cm²) | 103,000 | 102,000 | 105,000 | 104,000 | 170,000 | 100,000 | 106,000 | 102,000 |
| Notched Izod Impact strength (kg . cm/cm) | 5.9 | 7.9 | 10.2 | 9.9 | 13.0 | 9.8 | 7.5 | 9.6 |
| Falling Ball Impact strength (kg . cm) | 7 | 13 | 18 | 17 | 23 | 17 | 11 | 16 |
| Hot Water Resistivity | | | | | | | | |
| (80° C. 30 days) Preservation of Tensile strength (%) | 50 | 61 | 70 | 69 | 75 | 68 | 62 | 66 |
| Heat Distortion Temperature (°C.), 18.6 kg/cm²) | 105 | 95 | 235 | 233 | 245 | 235 | 219 | 230 | x is Poor
o is Good
 is Excellent
Δ is Fair
Moldability was evaluated from the viewpoint of Sink Mark and Mold Release.

EXAMPLES 7-10

A composition of polyethylene terephthalate (PET) having an intrinsic viscosity of 0.7 dl/g, ethylene-glycidyl methacrylate copolymer, barium stearates and the various reinforcements shown in Table 3, were compounded, and evaluated in a manner similar to the previous examples. The results are summarized in the following Table 3, from which it is apparent that the compositions of this invention, using various reinforcement systems, have good mechanical properties and are excellent in appearance.

TABLE 3

|  | Examples | | | | | Comparative | |
|---|---|---|---|---|---|---|---|
|  | 7 | 8 | 9 | 10 | 11 | 5 | 6 |
| Composition | | | | | | | |
| PET (parts by weight) | 100 | 100 | 100 | 100 | 100 | 100 | 100 |
| Glass Fiber (3 mm length, 10μφ) (parts by weight) | 10 | 10 | 10 | 10 | 10 | 10 | 10 |
| Other reinforcement (parts by weight) | Talc 20 | Talc 20 | Glass Beads 20 | Mica 20 | Asbestos 20 | Talc 20 | Talc 20 |
| E-GMA Copolymer (parts by weight) | 10 | 10 | 5 | 5 | 10 | 10 | — |
| Barium Stearate (parts by weight) | 1 | 1 | 1 | 1 | 1 | — | 1 |
| Triethylene glycol dibenzoate (parts by weight) | — | 2 | — | 2 | — | — | — |
| PET Oligomer (Intrinsic Viscosity 2) (parts by weight) | — | — | — | — | 2 | — | — |
| Moldability (Mold temperature/ Molding cycles) 120° C./40 sec. | o | | o | | | Δ | o |
| Mechanical Properties | | | | | | | |
| Tensile Strength (kg/cm²) | 1050 | 1100 | 1200 | 1250 | 1200 | 890 | 950 |
| Flexural Modulus (kg/cm²) | 70,000 | 69,000 | 72,000 | 70,500 | 71,000 | 65,000 | 69,000 |
| Notched Izod Impact Strength (kg . cm/cm | 7.0 | 6.5 | 5.0 | 5.5 | 7.9 | 5.0 | 1.9 |
| Hot Water Resistivity | | | | | | | |
| (80° C., days) Preservation of Tensile Strength %) | 68 | 70 | 66 | 66 | 68 | 55 | 51 |

TABLE 3-continued

|  | Examples | | | | | Comparative | |
| --- | --- | --- | --- | --- | --- | --- | --- |
|  | 7 | 8 | 9 | 10 | 11 | 5 | 6 |
| Appearance Warpage | o | o | o | o | o | o | Δ |
| Surface Smoothness | o |  |  |  |  | Δ | Δ | o is Good
⊚ is Excellent
Δ is Fair
Moldability was evaluated from the viewpoint of Sink Mark and Mold Release.

We claim:

1. Polyethylene terephthalate molding compositions which comprise
   (a) polyethylene terephthalate having an intrinsic viscosity of at least 0.4 as measured at 1% concentration in o-chlorophenol at 25° C.,
   (b) from 0.1 to 40 parts by weight, based on 100 parts by weight of polyethylene terephthalate, of a copolymer of an α-olefin, and a glycidyl ester of α,β-unsaturated-aliphatic carboxylic acid having the general formula

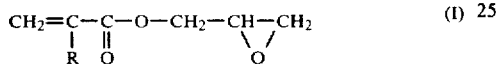

wherein R is hydrogen or a lower alkyl radical, and
   (c) from 0.1 to 5 parts by weight, based on 100 parts by weight of polyethylene terephthalate, of the barium salt of a fatty acid having 8 to 33 carbon atoms.

2. Polyethylene terephthalate molding compositions as claimed in claim 1, wherein the amount of the copolymer (b) is from 0.5 to 30 parts by weight.

3. Polyethylene terephthalate molding compositions as claimed in claim 1, wherein the copolymer (b) comprises at least one α-olefin, selected from the group consisting of ethylene and propylene, and at least one glycidyl ester of α,β-unsaturated-aliphatic carboxylic acid selected from the group consisting of acrylic acid, methacrylic acid and ethacrylic acid.

4. Polyethylene terephthalate molding compositions as claimed in claim 3, wherein said copolymer (b) comprises ethylene and glycidyl methacrylate.

5. Polyethylene terephthalate molding compositions as claimed in claim 1, wherein said copolymer contains the unit of α,β-ethylenically-unsaturated carboxylic acid in an amount ranging from 1 to 50% by weight.

6. Polyethylene terephthalate molding compositions which comprise
   (a) polyethylene terephthalate having an intrinsic viscosity of at least 0.4 as measured at 1% concentration in o-chlorophenol at 25° C.,
   (b) from 0.1 to 40 parts by weight, based on 100 parts by weight of polyethylene terephthalate, of copolymers of α-olefins and glycidyl esters of α,β-unsaturated-aliphatic carboxylic acids,
   (c) from 0.1 to 5 parts by weight, based on 100 parts by weight of polyethylene terephthalate, of the barium salt of fatty acids having 8 to 33 carbon atoms,
   (d) up to 100 parts by weight, based on 100 parts by weight of polyethylene terephthalate, of a reinforcement selected from the group consisting of glass fiber, asbestos, mica and talc, and
   (e) from 0 to 10 parts by weight, based on 100 parts by weight of polyethylene terephthalate, of a compound containing ester linkages, of the general formulas

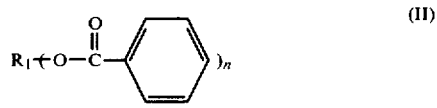

wherein $R_1$ is an alcoholic residue having 1 to 20 carbon atoms, and n is from 1 to 4,

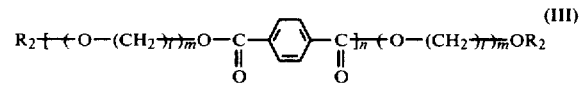

wherein $R_2$ is hydrogen or carboxylic residue, and l, m, and n are from 2 to 10, 1 to 10 and 1 to 30, respectively.

7. Polyethylene terephthalate molding compositions as claimed in claim 6 wherein the amount of the copolymer (b) is from about 0.5 to 30 parts by weight.

8. Polyethylene terephthalate molding compositions as claimed in claim 6 wherein the copolymer (b) comprises at least one α-olefin, selected from the group consisting of ethylene and propylene, and a glycidyl ester of an α,β-unsaturated-aliphatic carboxylic acid selected from the group consisting of acrylic acid, methacrylic acid or ethacrylic acid.

9. Polyethylene terephthalate molding compositions as claimed in claim 8, wherein said copolymer (b) comprises ethylene and glycidyl methacrylate.

10. Polyethylene terephthalate molding compositions as claimed in claim 6, wherein said copolymer (b) contains a unit of α,β-unsaturated-aliphatic carboxylic acid in an amount ranging from 1 to 50% by weight.

11. Polyethylene terephthalate molding compositions as claimed in claim 6, wherein the reinforcement (d) is glass fibers having an average standard diameter greater than 5.

12. Polyethylene terephthalate molding compositions as claimed in claim 6, wherein the compound containing the ester linkage represented by general formula II is selected from the group consisting of triethylene glycol dibenzoate, neopentyl glycol dibenzoate and polyethylene glycol dibenzoate.

13. Polyethylene terephthalate molding compositions as claimed in claim 6, wherein the compound containing the ester linkage represented by general formula III is ethylene terephthalate oligomer where n is from 1 to 30.

* * * * *

UNITED STATES PATENT AND TRADEMARK OFFICE
CERTIFICATE OF CORRECTION

PATENT NO. : 4,284,540

DATED : August 18, 1981

INVENTOR(S) : Iida et al

It is certified that error appears in the above-identified patent and that said Letters Patent are hereby corrected as shown below:

Column 1, line 15, "ae" should read --are--

Table 2, Line 16, Heading "Appearance", column 7, please insert the symbol -- ⊙ --

Line 33, before "is Excellent", please insert the symbol -- ⊙ --

Table 3, Line 19, Heading "Molding cycles)120°C/40 sec."

at columns 8, 10 and 11, please insert the symbol -- ⊙ --

Table 3, line 30, under the heading "Surface Smoothness"

please insert the symbol -- ⊙ -- in

UNITED STATES PATENT AND TRADEMARK OFFICE
CERTIFICATE OF CORRECTION

PATENT NO. : 4,284,540
DATED : August 18, 1981
INVENTOR(S) : Iida et al

It is certified that error appears in the above-identified patent and that said Letters Patent are hereby corrected as shown below:

columns 8, 9, 10 and 11.

Line 32, before "is Excellent", please insert the symbol -- ⊙ --

Claim 6, Formula III, before the second "O" please insert

--[--

Signed and Sealed this

Nineteenth Day of October 1982

[SEAL]

Attest:

GERALD J. MOSSINGHOFF

Attesting Officer

Commissioner of Patents and Trademarks